(12) United States Patent
Hahn et al.

(10) Patent No.: US 7,694,303 B2
(45) Date of Patent: Apr. 6, 2010

(54) METHOD FOR DYNAMIC OPTIMIZATION OF MULTIPLEXED RESOURCE PARTITIONS

(75) Inventors: Stephen C. Hahn, Redwood City, CA (US); Gary Pennington, Brighouse (GB)

(73) Assignee: Sun Microsystems, Inc., Santa Clara, CA (US)

( * ) Notice: Subject to any disclaimer, the term of this patent is extended or adjusted under 35 U.S.C. 154(b) by 1230 days.

(21) Appl. No.: 10/848,467

(22) Filed: May 17, 2004

(65) Prior Publication Data

US 2005/0198102 A1 Sep. 8, 2005

Related U.S. Application Data

(63) Continuation-in-part of application No. 09/964,148, filed on Sep. 25, 2001, now abandoned.

(51) Int. Cl.
*G06F 9/46* (2006.01)
*G06F 11/00* (2006.01)

(52) U.S. Cl. ................... 718/104; 718/100; 718/105; 714/3; 714/7

(58) Field of Classification Search .............. 718/104, 718/105, 100, 101, 102, 103, 1; 709/223–226; 714/2, 3, 7, 47

See application file for complete search history.

(56) References Cited

U.S. PATENT DOCUMENTS

| | | | | |
|---|---|---|---|---|
| 5,175,800 | A | | 12/1992 | Galis et al. ................ 395/51 |
| 5,838,968 | A | * | 11/1998 | Culbert ................. 718/104 |
| 6,125,394 | A | * | 9/2000 | Rabinovich ............. 709/226 |
| 6,154,787 | A | * | 11/2000 | Urevig et al. ............. 710/8 |
| 6,243,814 | B1 | * | 6/2001 | Matena .................. 726/3 |
| 6,651,182 | B1 | * | 11/2003 | Chang et al. .............. 714/3 |
| 6,799,208 | B1 | * | 9/2004 | Sankaranarayan et al. .. 709/223 |
| 6,859,926 | B1 | * | 2/2005 | Brenner et al. ........... 718/100 |
| 7,181,743 | B2 | * | 2/2007 | Werme et al. ........... 718/104 |
| 7,322,034 | B2 | * | 1/2008 | Crawford et al. ......... 719/310 |
| 2001/0008019 | A1 | * | 7/2001 | Vert et al. .................. 714/1 |
| 2002/0002609 | A1 | | 1/2002 | Chung et al. ............. 709/223 |
| 2003/0006988 | A1 | * | 1/2003 | Alford et al. ............. 345/440 |

OTHER PUBLICATIONS

Bisdikian, C. et al., "*Dynamic Reconfiguration of Hub-Based Networks*", Apr. 14, 1993, IEEE Computer Society.

Dini, P., et al., "*Automatic Reconfiguration for Runtime Feature-Interaction Resolution in an Object-Oriented Environment*", Oct. 11, 1995, FIW.

(Continued)

*Primary Examiner*—Meng-Ai An
*Assistant Examiner*—Abdullah Al Kawsar
(74) *Attorney, Agent, or Firm*—Marsh Fischmann & Breyfogle LLP; Kent A. Lembke; Michael L. Gencarella

(57) ABSTRACT

A method for dynamically allocating system resources is provided. The method initiates with identifying a goal associated with a corresponding partition of a resource being configured according to a first configuration. The method includes establishing a mathematical function yielding a value associated with the goal. Once a violation of the goal is detected due to a changing workload, alternative configurations are evaluated to meet the goal under the changing workload. Then, a highest ranked one of the alternative configurations is selected and substituted for the first configuration.

25 Claims, 7 Drawing Sheets

OTHER PUBLICATIONS

Heinrich, M., et al., "*A resource-Based Paradigm for the Configuring of Technical Systems from Modular Components*", Feb. 24, 1991, IEEE.

Brennan, R. W., et al., "*An Agent-Based Approach to Reconfiguration of Real-Time Distributed Control Systems*", Aug. 1, 2002, IEEE.

* cited by examiner

METHOD FOR DYNAMIC OPTIMIZATION OF MULTIPLEXED RESOURCE PARTITIONS

CROSS REFERENCE TO RELATED APPLICATIONS

This application is a continuation-in-part claiming priority under 35 U.S.C. §120 of U.S. patent application Ser. No. 09/964,148 filed on Sep. 25, 2001, now abandoned and entitled "METHOD AND APPARATUS FOR PARTITIONING RESOURCES WITHIN A COMPUTER SYSTEM." This application is herein incorporated by reference in its entirety for all purposes.

BACKGROUND

The advent of computer networks has led to the development of computer systems that perform computational operations on behalf of numerous client computer systems. These server systems are typically configured with large amounts of computing resources for processing concurrently executing computational workloads. One challenge in designing an operating system to manage such a server is to ensure that computer system resources are allocated between computational workloads so that the minimum requirements of each workload are satisfied, while executing the workloads in an efficient manner.

Some computing systems provide support for partitioning a machine-wide resource into smaller sets and then associating one or more workloads with each of the sets. In this way, the specific processes do not compete with other processes for access to the resource set. One shortcoming of the systems that provide the partitioning support is that the partitioning is static. Thus, to change the partitions for the resource pool is labor intensive and can require many hours of expensive system consultancy to optimize, as well as the operator's awareness of resource requirements for excepted workloads. Additionally, any optimizations from adjustment of the static partitions may turn out to be short-lived and fragile in the face of volatile workloads with the optimization turning into a long running ad-hoc process requiring a large amount of labor intensive intervention from skilled administrators.

Other operating systems have developed a mechanism for assembling a group of resources into a fixed "container" that processes can bind to in order to access the resources. However, resources within a fixed container cannot be flexibly changed over time to accommodate changing resource requirements for the various system workloads. Furthermore, due to the absence of a resource pool abstraction, there is no mechanism for multiplexing access to resources.

SUMMARY

Embodiments of the present invention provide a method and system for partitioning resources according to objectives and constraints in response to changing workload conditions. The present invention can be implemented in numerous ways, including as a device, a method or a computer readable medium. Several embodiments of the present invention are described below.

In one embodiment, a method for dynamically allocating system resources is provided. The method initiates with identifying an objective associated with a corresponding partition of a resource being configured according to a first configuration. The method includes establishing a mathematical function yielding a value associated with the objective. Once a violation of the objective is detected due to a changing workload, alternative configurations are evaluated to meet the objective under the changing workload. Then, a highest ranked one of the alternative configurations is selected and substituted for the first configuration.

In another embodiment, a computer readable medium having program instructions for dynamically allocating system resources is provided. The computer readable medium includes program instructions for identifying an objective associated with a corresponding partition of a resource being configured according to a first configuration and program instructions for establishing a mathematical function representing the objective. Program instructions for detecting a violation of the objective due to a changing workload and program instructions for evaluating alternative configurations to meet the objective under the changing workload are included. Program instructions for selecting a highest ranked one of the alternative configurations and program instructions for substituting the first configuration with the highest ranked one of the alternative configurations are provided.

In yet another embodiment, a computing device capable of dynamically allocating resources between concurrently executing workloads is provided. The computing device includes a resource having a plurality of partitions. The resource is associated with a first configuration of the plurality of partitions for executing the workloads. A dynamic resource allocation module is configured to enable selection of goals associated with each of the plurality of partitions. The dynamic resource allocation module further includes a configuration monitoring module for collecting and analyzing data associated with the workloads and a statistical process control module configured to smooth the data collected by the configuration monitoring module by considering both a magnitude and a duration of the data collected. The smoothed data is analyzed to determine if one of the goals is unsatisfied. The dynamic resource allocation module includes a configuration change module for changing the first configuration to a second configuration by rearranging the plurality of partitions in response to determining that the goal is unsatisfied.

In yet another embodiment, a distributed computing resource system capable of dynamically allocating resources is provided. The system includes a server in communication with at least one consumer over a distributed network. The server includes a resource having a plurality of partitions. The resource is associated with a first configuration of the plurality of partitions for executing a workload associated with the at least one consumer. A dynamic resource allocation module configured to enable selection of objectives associated with each of the plurality of partitions is included. The dynamic resource allocation module further includes logic for tracking data associated with the workload. Logic for filtering the tracked data is included in the dynamic resource allocation module. The filtered data is analyzed to determine if one of the objectives is unsatisfied. Logic for changing the first configuration to a second configuration by rearranging the plurality of partitions in response to determining that the one of the objectives is unsatisfied is included in the dynamic resource allocation module.

Other aspects of the invention will become apparent from the following detailed description, taken in conjunction with the accompanying drawings, illustrating by way of example the principles of the invention.

DETAILED DESCRIPTION

Figure 1:
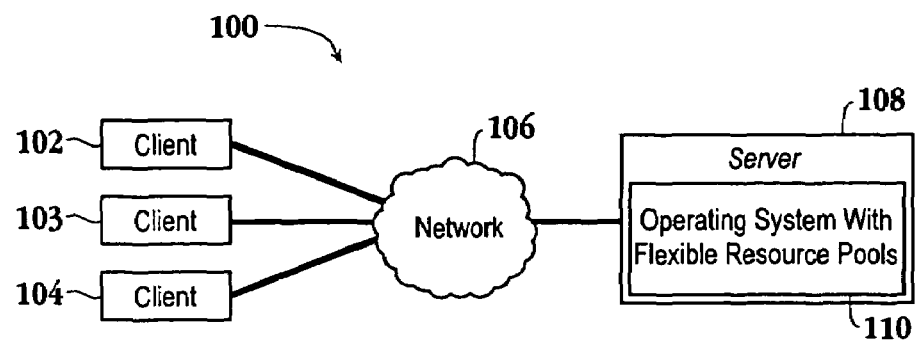
FIG. 1 is a simplified schematic diagram illustrating a distributed computing system in accordance with one embodiment of the invention.

An invention is described for a system and method for partitioning resources according to objectives and constraints. It will be obvious, however, to one skilled in the art, that the present invention may be practiced without some or all of these specific details. In other instances, well known process operations have not been described in detail in order not to unnecessarily obscure the present invention.

The embodiments of the present invention provide a method and system for partitioning resources within a computing device according to objectives and constraints. As used herein, a resource represents a process-bindable operating system (OS) entity, most generally, but may be used to refer to the objects constructed by a kernel subsystem offering some form of partitioning. Existing examples of resources include scheduling classes in the general sense and processor sets in the more specific sense, which may also include memory set and swap set abstractions. In essence, a resource may be any suitable computational entity, e.g., objects constructed by a kernel subsystem offering partitioning. Additionally, a computer or computing device, as used herein, shall include a standalone computer system having its own processor, its own memory, and its own storage, or a distributed computing system, which provides the above mentioned computer resources to a networked terminal.

A resource pool represents an association between various groups of partitionable resources, such as that between a processor set and a memory set. This relationship is accomplished via the pool attribute specified in a project data file or via the libpool interface, which allows explicit binding of processes, tasks, and projects to pools. Resource pools are further defined below. The resource pools facility brings together process-bindable resources into a common abstraction called a pool. Processor sets and other entities can be configured, grouped, and labelled in a persistent fashion such that workload components can be associated with a subset of a system's total resources. The libpool library provides a C language API for accessing this functionality. The libpool interfaces provides mechanisms for manipulating resource pools configurations and the behavior of workload components with respect to these configurations. These configurations may be file representations or the state of an active operating system, e.g., SOLARIS, instance.

The embodiments described herein allow an administrator to set objectives and constraints for resource partitioning. In response to violation of an objective, the system triggers a reconfiguration examination to identify a different partitioning scheme that satisfies the constraints. Thus, the re-partitioning occurs in an automated mode, thereby alleviating the administrator from manually reconfiguring the system due to workload change. While the resource pools discussed below specifically reference processor sets, this is not meant to be limiting. For example, the partitionable resources may be memory sets, swap sets, etc. In essence, the embodiments discussed herein may be applied to any suitable partitionable resource. A general description of the system is provided below followed by a more detailed description referencing the Figures.

A system daemon that is active when dynamic resource allocation is required is responsible for executing the functionality described herein. The process described below identifies available resources and then monitors workload to identify when user specified objectives are no longer being satisfied. At this time, alternative configurations are considered, i.e., a reconfiguration examination is commenced, within limits defined by user specified constraints, which is intended to optimize user specified objectives. Remedial action is then taken. This action may simply be logging that user specified objectives can no longer be achieved, or, more desirably, re-partitioning the resources to enable objectives to be satisfied. A reconfiguration examination may also be triggered asynchronously if the user or administrator changes workload objectives or the resources available to the system are modified. Upon reconfiguration, the monitoring of workload objectives is resumed.

Direction to the system daemon making changes to a configuration is specified in terms of a series of constraints and objectives. Constraints eliminate potential changes to a configuration and may be specified by the user. Typical constraints are the maximum and minimum allocations specified in the libpool configuration. Additional constraints such as "pinned" components that are not available to be moved from a resource pool set are also considered.

The system daemon will change the resource assignments of the current configuration to generate new candidate configurations that observe the established constraints. Objectives are established in a similar fashion to the constraints. Once established, the objectives are all considered to determine the relative value of different moves in relation to the existing configuration. An exemplary set of property names, which include objectives and constraints that may be established for consideration is documented in Table 1.

TABLE 1

| PROPERTY NAME | Type | Category | Description |
| --- | --- | --- | --- |
| system.poold.log-level | string | Configuration | Logging level |
| system.poold.log-location | string | Configuration | Logging Location |
| system.poold.monitor-interval | unsigned int | Configuration | Monitoring sample interval |

TABLE 1-continued

| PROPERTY NAME | Type | Category | Description |
|---|---|---|---|
| system.poold.history-file | string | Configuration | Decision history location |
| system.poold.pid | int | Configuration | poold pid |
| pset.max | unsigned int | Constraint | Maximum number of CPUs for this processor set |
| pset.min | unsigned int | Constraint | Minimum number of CPUs for this processor set |
| cpu.pinned | boolean | Constraint | CPU pinned to this processor set |
| system.poold.objectives | string | Objective | Formatted string following poold's objective expression syntax |
| pset.poold.objectives | string | Objective | Formatted string following poold's expression syntax |
| pool.importance | unsigned int | Multiplier | User assigned importance |

Two exemplary categories of objectives include workload dependent objectives and workload independent objectives. A workload dependent objective is an objective that will vary according to the nature of the imposed workload, for example the utilization objective. That is, the utilization figure for a resource set will vary according to the nature of the workload active in the set. A workload independent objective is an objective that does not vary according to the nature of the imposed workload, for example the CPU locality objective. The evaluated measure of locality for a resource set does not vary with the nature of the workload that is active in the set. Table 2 illustrates exemplary objectives, which are stored in property strings in the libpool configuration, in one embodiment.

TABLE 2

| NAME | Valid Elements | Operators | VALUES | | |
|---|---|---|---|---|---|
| wt-load | system | N/A | N/A | | |
| locality | pset | N/A | loose | tight | none |
| utilization | pset | < > ~ | 0-100% | | |

The objectives are prefixed with an optional importance. The importance acts as a multiplier for the objective and thus increases the significance of its contribution to the objective function evaluation. If no importance is specified, the importance defaults to take a value of 1. It should be appreciated that where an element type supports more than one type of objective, e.g., pset, then it is acceptable to specify multiple objective types for the element. It is also acceptable to specify multiple utilization objectives on a single pset, as described below in more detail.

The wt-load objective favors configurations that match resource allocations to resource utilization. This objective enables allocation of more resources when active. In one embodiment, the wt-load objective is applied with the constraints established using min and max properties, thereby allowing the dynamic resource pools (DRP) to manipulate resources freely within those constraints.

The locality objective influences the impact that locality has upon the chosen configuration. This objective may take one of three values: tight, loose, and none. If the locality objective is set to tight, configurations that maximize resource locality will be favored. If the locality objective is set to loose, configurations that minimize resource locality will be favored. When the locality objective is set to none, configuration determination will be impartial with respect to resource locality.

The utilization objective favors configurations that allocate resources to partitions which are failing to preserve the specified utilization objective. These objectives may be specified in terms of an operator and a value. Exemplary operators include: <, >, and ~. The "less than" operator (<) is used to indicate that the specified value should be treated as a maximum target value. The "greater than" (>) operator is used to indicate that the specified value should be treated as a minimum target value. The "about" operator (~) is used to indicate that the specified value should be treated as a target value about which some fluctuation is acceptable. It should be appreciated that one objective of each type of operator > may be set and if the ~ operator is set then the < and > operators may not be set (and vice versa). It is possible to set a < and a > operator together and the values are validated to ensure they do not overlap.

An exemplary objective set is as follows:
  system.poold.objectives 10:wt-load

This objective set indicates that the wt-load objective should be applied to the configurations to be evaluated and that the relative importance of the wt-load objective is 10 times that of an un-weighted objective.

The pset objective may have the following objectives set:
  pset.poold.objectives "locality loose"

This objective set indicates that the locality objective should be applied to the specified pset and that configurations that favor minimized locality should be scored highly. The objective takes the default importance of 1. A more complex pset example:
  pset.poold.objectives "utilization > 30; utilization < 80; locality tight"

indicates that the specified pset should be assessing three objectives, keeping utilization between 30 and 80% and maximizing locality for the processor set. The objective set takes the default importance of 1.

Resource Pools extended the concept of partitionable resources as defined in U.S. patent application Ser. No. 09/964,148, which has been incorporated by reference. These resource pools may be implemented with the SOLARIS operating system of the assignee. For a single executing SOLARIS instance, resources of a single type are allocated to a single partition. In other words, a resource is not associated with zero or more than one partition, in one embodiment. Thus, there may be one or more partitions for each type of resource, each containing a unique set of resources. It will be appreciated to one skilled in the art that the embodiments described herein enable the automatic reconfiguration of the resource pools. It should be further appreciated that while the SOLARIS operating system is mentioned here, the embodiments described herein are not limited to this operating system, as any suitable operating system, such as for example, UNIX, WINDOWS and LINUX, may be utilized.

The available resources are determined by interrogating the active Pools Configuration to find partitions. In one embodiment, all resources within all partitions are summed to determine total available resources for each type of resource that is controlled. This quantity of resources is the basic configuration of resources with which the system daemon (poold(1M)) can determine allocations. However, there are constraints upon this configuration of resources that that define boundaries within which allocations can be made. For example, with reference to Table 2, "cpu.pinned" is a libpool property that indicates that a particular CPU should not be moved from the processor set in which it is located. In one embodiment, an administrator may set this property to maximize cache utilization for a particular application that is executing within a processor set. The properties of pset.max and pset.min were introduced with libpool and are constraints on the maximum and minimum number of processors that can be allocated to a processor set. Within these constraints, a resource partition's resources are able to be allocated to other resource partitions in the same SOLARIS instance. Access to the resource is obtained by binding to a pool to which the resource set is associated. In one embodiment, binding is performed at login. In another embodiment, binding is performed by an administrator with the PRIV_SYS_RES_CONFIG privilege.

A resource partition's resources are also available for allocation to other SOLARIS instances when the resources are provided in a chassis that is capable of dynamically allocating resources between multiple SOLARIS instances. This feature may be referred to as Dynamic Reconfiguration (DR). It should be appreciated that a DR operation may increase, reduce or have no effect on the resources available.

The "control scope" for poold(1M) is the set of available resources for which it has primary responsibility for effective partitioning and management. It should be appreciated that this is not an exclusive relationship, i.e., other mechanisms may still be used to manipulate resources within the "control scope" of an instance of poold(1M). However, it does mean that poold(1M) is at liberty to manipulate the availability of this resource. In one embodiment, poold(1M) will endeavor to maintain control for all resource partitions with the available set of resources for its "control scope". It is possible for a partition to move "out of control" while poold(1M) is active. At these times, poold(1M) will attempt to restore control via the judicious manipulation of available resources determined through a reconfiguration examination as described in more detail below. However, if no additional resources can be found within poold(1M)'s scope, then poold(1M) will log information about the resource shortage.

The system daemon, poold(1M), observes the resources within its scope of control. The purpose of this monitoring is to identify that workload dependent objectives are still being met. It should be understood that a resource utilization measure is required for each type of resource, so that the consumption of the resource may be easily observed. In one embodiment, with reference to processor sets, the resource utilization is derived as follows: a) all measurements are made from across all processors in a set; and b) the resource utilization is the non-idle time in the range of 0 to 100%.

A partition for which user configured objectives are not met is a control violation. It should be appreciated that the following discussion of synchronous and asynchronous control violations is conducted from the viewpoint of the system daemon, poold(1M). A synchronous violation is a violation of an objective that was detected by poold(1M) in the course of its workload monitoring. An asynchronous violation arises independent of this monitoring. The Statistical Process Control (SPC) approach used for the embodiments described below centers around the establishment of "zones of control" related to a mean value. A set of targets based on statistically significant behavior are then applied to the sampled data to identify meaningful fluctuations from the mean which can indicate that control is about to be lost.

The values under control are assumed to be randomly distributed around the mean, although techniques exist for applying control to non-normally distributed data. Through the application of SPC, it may be determined when a resource shortfall may be occurring. It should be appreciated that the establishment of the zones of control help eliminate "jitter." Thus, unnecessary reconfigurations can be detected and eliminated to help improve the software's predictive capabilities.

In addition to the identification by examination of workload behavior, a re-evaluation of the objective function is required if any of the following violations occur: a) resources are added/removed from a control scope; b) the control scope is reconfigured by the administrator; and c) the resource controller, poold(1M), is restarted. It should be appreciated that these events can occur asynchronously with respect to the workload monitoring activity and poold(1M) is responsible for handling these events correctly. Additional examples of such asynchronous events include: manual resource transfers; user modification of established objectives and constraints; DR operations to add/remove resources; and user intervention to change the state of a CPU.

When it is determined that a resource consumer is short of resources, a suitable response is generated. Here a reconfiguration examination (also referred to as a re-evaluation) may commence as discussed further below. The initial response of the adopted approach is to presume, until shown otherwise, that more of the resource that is in short supply will improve performance. Here, alternative configurations are examined and evaluated in terms of the objectives specified in the configuration for the scope of control. The administrator may assign a relative importance to each objective as mentioned above. The administrator also establishes constraints, which are used to restrict the number of alternative configurations under consideration. The objectives, along with their importance, are used to score the various alternative configurations. Alternative configurations are represented as potential moves of resources between partitions. The alternative configuration that scores the highest, i.e., ranked the highest, in the objective function is identified as the target configuration. This may indicate that a reallocation of resources will result in an improved ability to match the user specified goals.

In one embodiment, this process is refined over time as the results of resource movements are monitored and each resource partition is evaluated for responsiveness. The system daemon maintains a decision history that can be examined to observe whether the workload in a particular partition responded positively to changes in available resource. This decision history will be used to avoid reconfigurations that historically did not show improvements in the evaluation of the objective function. In another embodiment, changes in the composition of the objective function will be used to tag the decision history, which will help in determining the relevance of the historical data to the current decision. Other information, such as process names and quantities, may be used to further help determine the relevance of the historical data.

FIG. 1 is a simplified schematic diagram illustrating a distributed computing system in accordance with one embodiment of the invention. Distributed computing system 100 includes a collection of client computing systems 102 through 104 that are coupled to a server computing system 108 through a network 106. Clients 102 through 104 can generally include any device on a network including computational capability and including a mechanism for communicating across the network. Server 108 can generally include any computing device including a mechanism for servicing requests from clients 102 through 104 for computational and/or data storage resources. It should be appreciated that clients 102 through 104 and server 108 can include any type of computing device such as, for example, a computer system based on a microprocessor, a main frame computer, a digital signal processor, a portable computing device, a personal organizer, a device controller, and a computational engine within an appliance. In one embodiment, clients 102-104 may be referred to as consumers. Here, a service provider, through server 108 or multiple servers, may distribute information requested by the consumers.

Clients 102 through 104 and server 104 and server 108 include central processing units (CPUs) that execute threads. Threads are entities that generate a series of execution requests, while CPUs are entities that can satisfy the execution requests. Network 106 can generally include any type of wire or wireless communication channel capable of coupling together computing notes, e.g., a local area network, a wide area network, or a combination of the networks. In one embodiment of the invention, network 106 includes the Internet. Server 108 includes an operating system 110 that supports flexible resource pools, which can be dynamically modified during system operation as described herein. One skilled in the art will appreciate that although the present invention is described in the context of the server computer system, the present invention is not limited to a server computer system. In general, the present invention can be applied to any computer system that allocates computational resources to different computational workloads, e.g., a computing device operating in a provider/consumer system.

Figure 2:
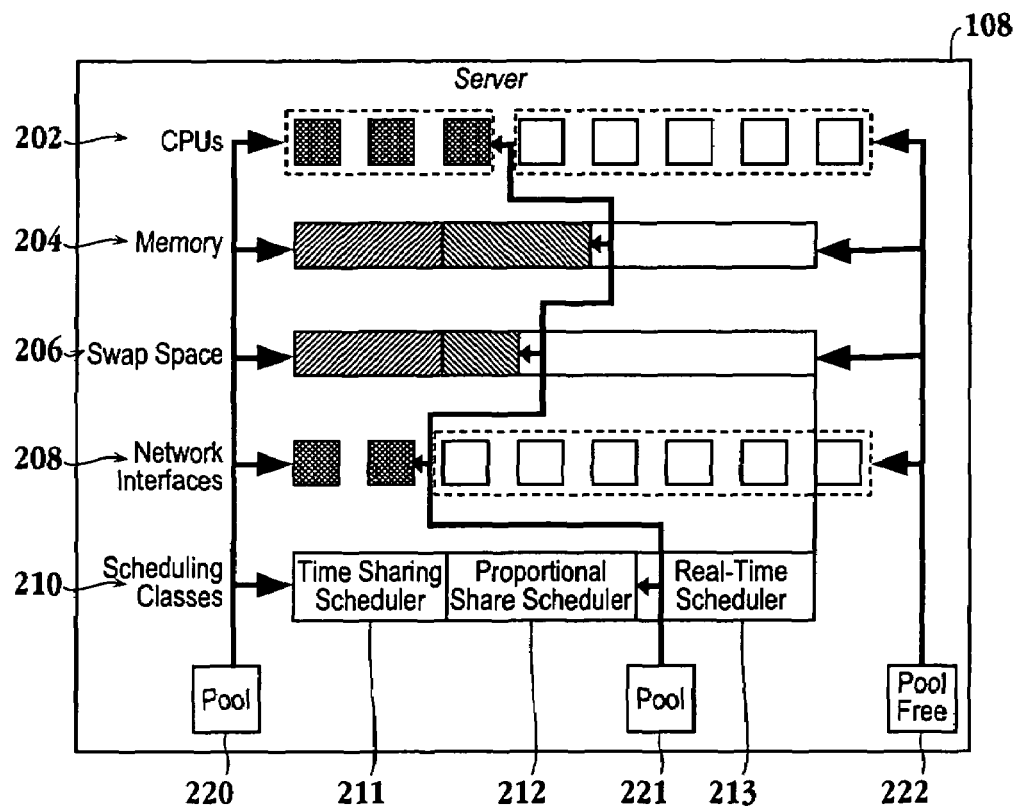
FIG. 2 is a simplified schematic diagram illustrating how computer system resources are allocated to pools in accordance with one embodiment of the invention.

FIG. 2 is a simplified schematic diagram illustrating how computer system resources are allocated to pools in accordance with one embodiment of the invention. As illustrated in FIG. 2, server 108 contains various computational resources, including central processing units 202, memory 204, swap space 206, network interface 208 and scheduling classes 210. CPUs 202 include one or more CPUs within server 108. It should be appreciated that it is possible to allocate an entire CPU to a pool, or alternatively, a fraction of a CPU. Memory 204 includes the main memory resources of server 108. Swap space 206 includes disc space that is used as a backing store for the virtual memory system of server 108. Network interfaces 208 include different channels for connecting server 108 with network 106. It should be noted that network resources can alternatively be partitioned by allocating "available network bandwidth" instead of individual network interfaces.

Scheduling classes 210 are not actually system resources for which processes contend, but they can similarly be allocated to pools. For example, in FIG. 2, time sharing scheduler 211 is assigned to pool 220, proportional share scheduler is signed to pool 221 and real time scheduler 212 is unassigned. As illustrating in FIG. 2, some of the resources within server 108 are allocated to pool 220 while other resources are allocated to pool 221. Note that both pool 220 and pool 221 share the same set of CPUs, while pools 220 and 221 do not share memory 204, swap space 206, or network interfaces 208. In this way, non-critical system resources can be shared, while other resources, deemed critical to a workload's successful execution, are not shared. This is an important advantage because sharing resources gives rise to more efficient resource utilization, which leads to better system performance.

Figures 3A, 3B:
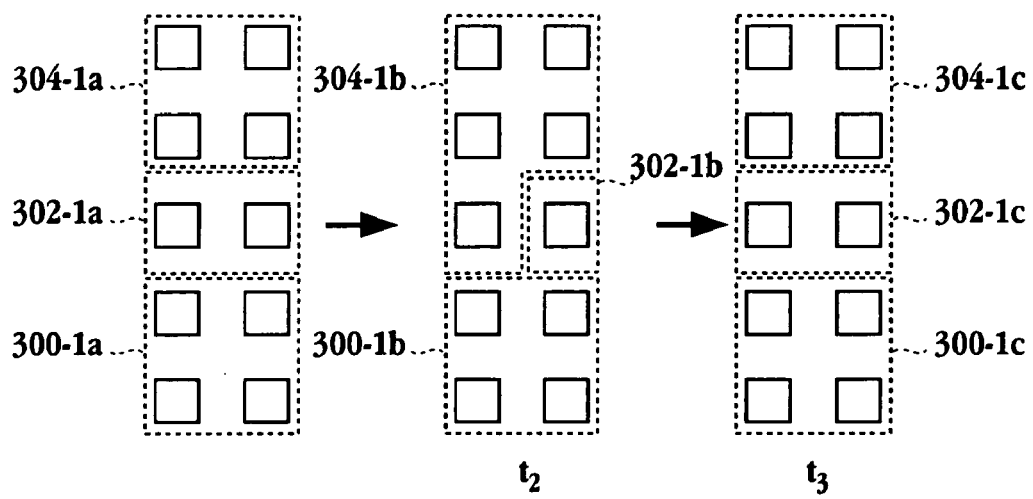
FIGS. 3A and 3B are simplified schematic diagrams illustrating a scheme for dynamic resource allocation in accordance with one embodiment of the invention.

FIGS. 3A and 3B are simplified schematic diagrams illustrating a scheme for dynamic resource allocation in accordance with one embodiment of the invention. FIG. 3A includes a table with minimum and maximum values for corresponding partitionable, resources. For example, the partitionable resource may be a processor set including a plurality of central processing units (CPUs) dedicated for each resource pool. Thus, for processor set A, a minimum of two processors, and a maximum of six processors, are required. Similarly, for processor set B the minimum number of processors is set at one and the maximum at four, while for processor set C the minimum is set at four and the maximum at twelve. It should be appreciated that the pset.min and pset.max constraints of Table 1 may be used to set the constraints of FIG. 3A.

Moving to FIG. 3B, partitions 300-1a, 302-1a, and 304-1a represent a partitioning of the resources, i.e., processors. Here, processor set A includes four processors illustrated in region 304-1a, processor set B includes two processors illustrated in region 302-1a, and processor set C is associated with four processors illustrated in region 300-1a. Thus, a total of ten processors are included in the amount of resources within the computing device associated with this partitioning scheme. As the workload changes, the partitioning scheme may be automatically adjusted through the embodiments described herein. For example, at time $t_2$, which is represented by the partitioning scheme illustrated by regions 300-1b, 302-1b, and 304-1b, the partitioning scheme has been adjusted in order to satisfy the needs that have changed due to the workload change. As can be seen, the number of processors associated with processor set A has been increased by one. That is, in response to an increased workload, a processor from processor set B has been assigned to processor set A.

Continuing with FIG. 3B, at a later time $t_3$, the partitioning scheme may again be readjusted in order to accommodate the changing workloads. As illustrated by partition regions 300-1c, 302-1c and 304-1c, the partitioning scheme has returned to the original scheme illustrated through regions 300-1a, 302-1a, and 304-1a. It should be appreciated that in the first partitioning illustrated by regions 300-1b, 302-1b, and 304-1b, that due to the restriction, or constraint, that processor set C requires a minimum of four CPUs, there was only a single choice as far as where to allocate an additional CPU from. That is, the additional CPU could only come from the resources associated with processor set B. However, if a minimum number of resources associated with processor set C was less than four, an additional processor may have been assigned from processor set C to processor set A. It will be apparent to one skilled in the art that any of the constraints or objectives listed above may be applied to obtain a desired outcome for the system.

Figure 4:
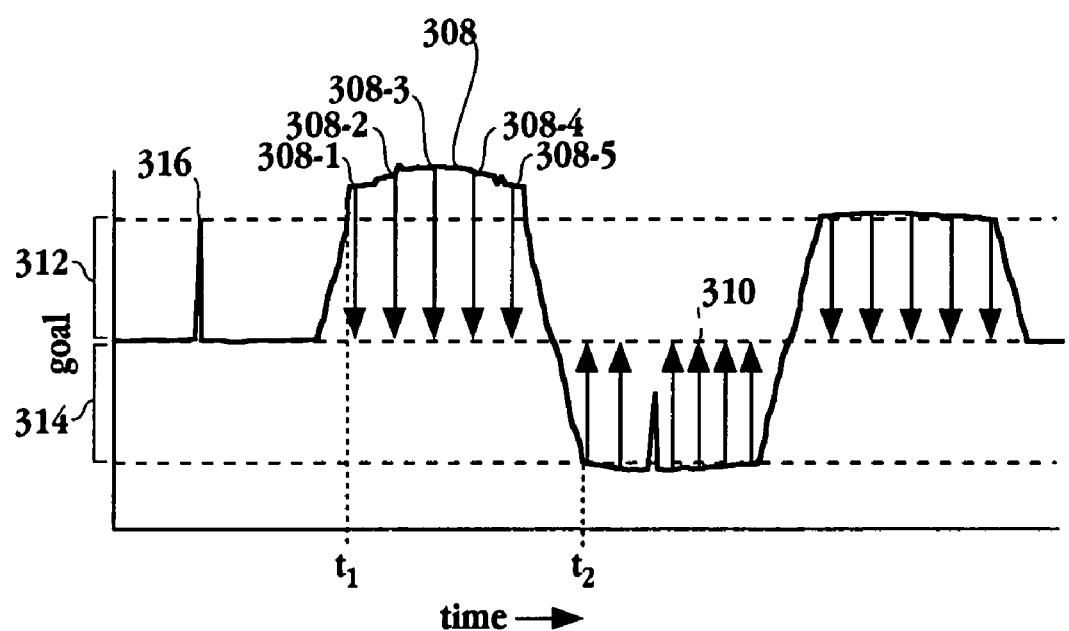
FIG. 4 is a graph of the workload experienced by a partition or resource over time and the corresponding adjustments in accordance with one embodiment of the invention.

FIG. 4 is a graph of the workload experienced by a partition or resource over time and the corresponding adjustments in accordance with one embodiment of the invention. Here, the workload is represented by line 308 while the goal or objective is represented by line 310. As can be seen at time $t_1$ the workload begins to increase to a level that is significantly above a set objective. For example, if the objective is set at 50% workload for the resource pool, and then the incoming traffic changes to justify a reconfiguration, the system will reconfigure in order to meet the objective of 50% workload for the pool. The objective of 50% workload may be captured through the utilization objective of Table 2.

It should be appreciated that zones of control may be established in order to set a threshold level for the workload to increase prior to triggering a reconfiguration examination. For example, regions 312 and 314 represent zones of control around the objective indicated by line 310. In one embodiment, the zones of control represent multiples of a standard deviation associated with the monitoring of the utilization objective. Thus, at times $t_1$ and $t_2$ the workload increase has achieved a threshold level outside the zones of control, and justifies altering the partitioning scheme through a reconfiguration. In one embodiment, spurious blips or spikes are prevented from triggering a reconfiguration by requiring a time component and a threshold value to be achieved in order to trigger the reconfiguration. Thus, spike 316 will not trigger a reconfiguration as the magnitude of the change is outside the zone of control, but the time duration component has not been satisfied. It will be apparent to one skilled in the art that any suitable time limit may be set here.

Continuing with FIG. 4, arrows 308-1 through 308-5 illustrate various reconfigurations attempted by the system that may or may not have been successful in returning the operating conditions to the desired goal. For example, reconfigurations associated with arrows 308-1 through 308-4 appear not to have any impact on returning the system to the desired goal. However, the reconfiguration associated with 308-5 appears to have an impact on the workload associated with the resource pool. For example, the reconfiguration of FIG. 3B, where an extra processor was allocated to resource pool A, is one example of a reconfiguration that may have enabled the workload to return to the desired goal. Returning to FIG. 4, at time $t_2$ the workload decreases and crosses over the zone of control on a low level. Thus, the pool has excess resources that may be allocated to another resource pool requiring the resource. Here again, a number of reconfigurations may be applied in order to achieve returning the system to the desired goal. Thus, the continual monitoring of the system triggers automatic readjustments in order to meet changes being experienced by the system, thereby eliminating the need for manual intervention by an administrator.

Figure 5:
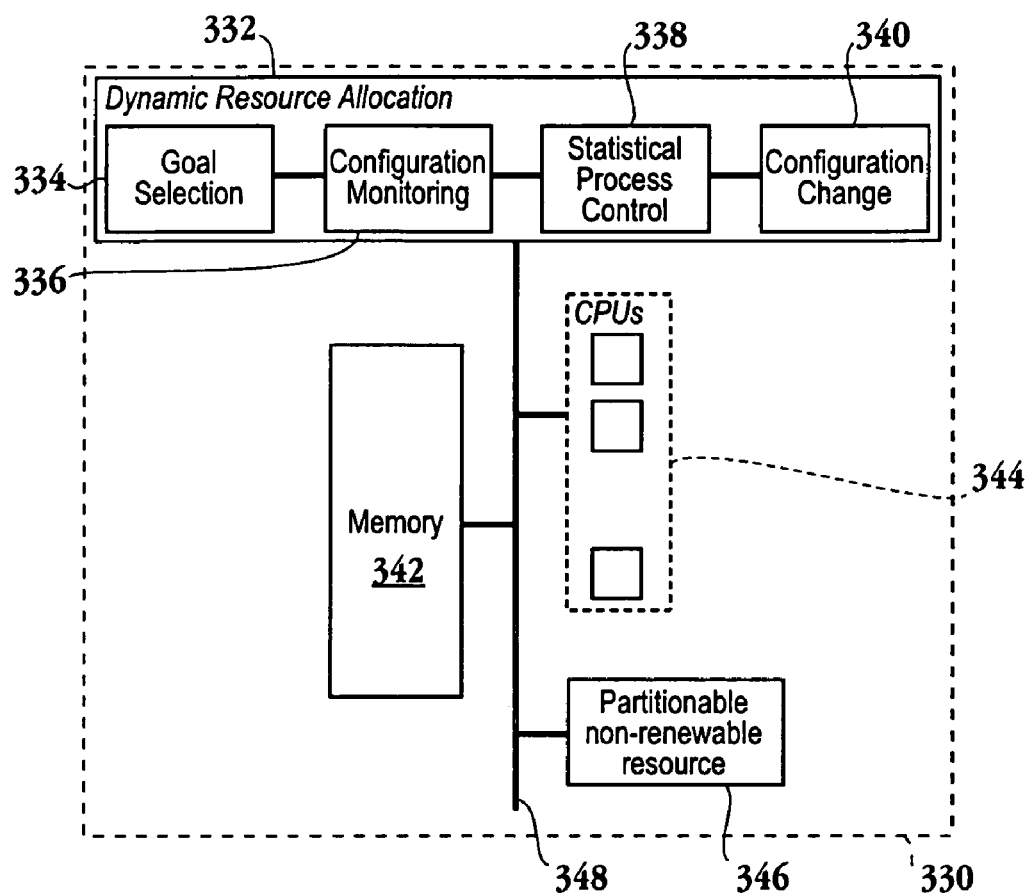
FIG. 5 is a simplified schematic diagram illustrating the modules for dynamic resource allocation on a computing device in accordance with one embodiment of the invention.

FIG. 5 is a simplified schematic diagram illustrating the modules for dynamic resource allocation on a computing device in accordance with one embodiment of the invention. Computing device 330 includes dynamic resource allocation module 332 in communication with memory 342 and CPU pool 344 over bus 348. As discussed above, any suitable partitionable resource, such as, partitionable resource module 346, may be incorporated into computing device 330 and partitioned according to the embodiments described herein. Dynamic resource allocation module 332 includes goal selection module 334, configuration monitoring module 336, statistical process control module 338, and configuration change module 340.

Goal selection module 334 enables the selection of objectives, such as the objectives of Table 2. Configuration monitoring module 336 enables the collection and analysis of data associated with the workloads. Statistical process control module 338 smoothes the data collected by configuration monitoring module 336. In one embodiment, statistical process control module 338 is configured to calculate zones of control around the selected objectives. These zones of control assist in smoothing out detected spikes to introduce stability into the system thereby limiting a reconfiguration examination after achieving a confidence level that a change is required. One skilled in the art will appreciate that the systems resources are required to monitor the system as well as perform the reconfiguration.

Therefore, through statistical process control module 338, the amount of monitoring and the number of reconfigurations are minimized through statistical techniques. In one embodiment, these statistical techniques include calculating average utilization values, calculating zones of control around the utilization values, and establishing a set a statistical rules where reconfiguration is performed if one of the statistical rules is broken. In other words, a utilization objective or any other suitable objective is converted into an internal normalized representation where spikes are smoothed to introduce stability into the monitoring of the system. Configuration change module 340 includes the functionality for implementing a reconfiguration. Here, the reconfiguration implemented may be the reconfiguration associated with the highest ranking change which satisfies the specified objectives. It should be appreciated that computing device 330 may act as a server, such as server 108 with reference to FIG. 1. Thus, workloads generated by a plurality of clients in communication with computing device 330 may change over time. Through the embodiments described herein, computing device 330 automatically updates resources allocated for the workloads generated by the clients in order to optimize the system configuration. The client/server relationship may also be referred to as a producer/consumer relationship. For example, a service provider may communicate requested data to a plurality of clients through one or more servers.

Figure 6:
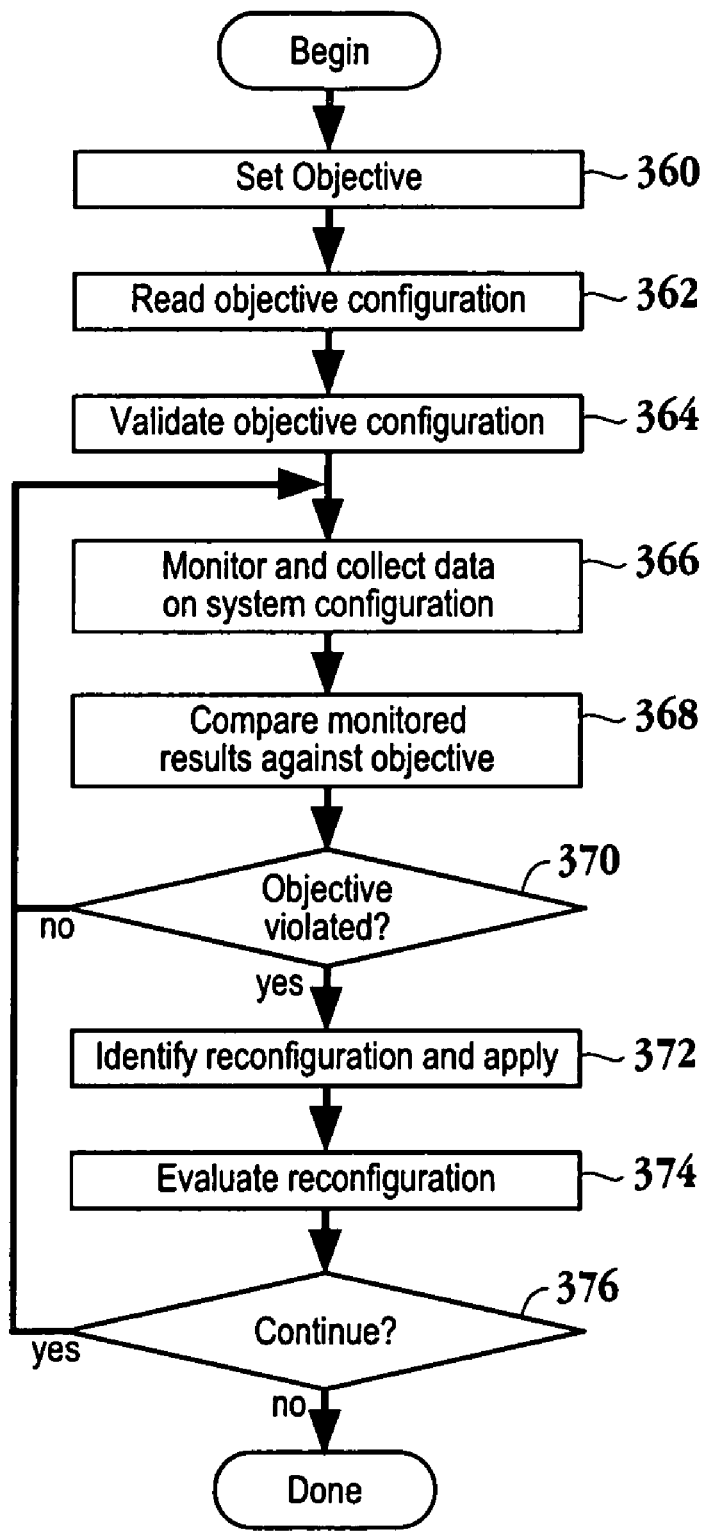
FIG. 6 is a flow chart diagram illustrating the method operations for dynamically allocating system resources in accordance with one embodiment of the invention.

FIG. 6 is a flow chart diagram illustrating the method operations for dynamically allocating system resources in accordance with one embodiment of the invention. The method initiates with operation 360 where one or more objectives are set. The objectives, also referred to as goals, may be any suitable objective such as the objectives mentioned above with reference to Table 2. The method then advances to operation 362 where the objective configuration is read. For example, each objective may be translated into a mathematical formula in order to be tracked by a computing device. The method then proceeds to operation 364 where the objective configuration is validated. Here, it is verified that the objectives will not violate any constraints associated with the computing device executing the objective.

The method of FIG. 6, then moves to operation 366 where data associated with the system configuration is monitored and collected, e.g., through the configuration monitoring module of FIG. 5. Here, the operating system facilities may be queried in order to gather the necessary data. It should be appreciated that the system will continue to store data until there is enough data to reach statistical significance. The method then advances to operation 368 where the monitored results are compared against the objective. In one embodiment, system stability is enhanced by establishing zones of control around the monitored results. As an objective may be associated with a mathematical function, the actual workload or some other observable, is compared against the desired objective in order to determine if the objective has been violated in operation 370. It should be appreciated that any of the objectives with reference to Table 2 may be used here.

If an objective has not been violated, then the method returns to operation 366 and repeats as described above. If an objective has been violated, the method moves to operation 372 where a reconfiguration is identified and applied. Here, through a reconfiguration examination, possibilities for the reconfiguration are generated. In one embodiment, these possibilities are scored and ranked. In addition, the reconfiguration examination may look at past history to eliminate undesirable moves as mentioned above. For the scoring and ranking, a direct comparison with how much of a resource is available and how much is added, where a linear improvement is assumed, generates an estimate of the effect on the system. Thus, the highest scored and ranked reconfiguration which is available, is the reconfiguration that will be used in order to return the system to operate within the objectives.

The method then advances to operation 374 where the reconfiguration is evaluated over some time period. Here, the reconfiguration can be examined to see if the system workload or any other suitable objective that is being monitored, has improved. If the reconfiguration has not improved the system operation then the reconfiguration may be marked as an undesirable reconfiguration and not utilized for a certain period of time or for a number of future reconfiguration examinations. That is, the system maintains a history as discussed above and this history may be used to avoid configurations that are not helpful. The method then proceeds to decision operation 376 where it is determined to continue the process or to end the process. If the process is continued the method returns to operation 366 and repeats as described above.

Figure 7:
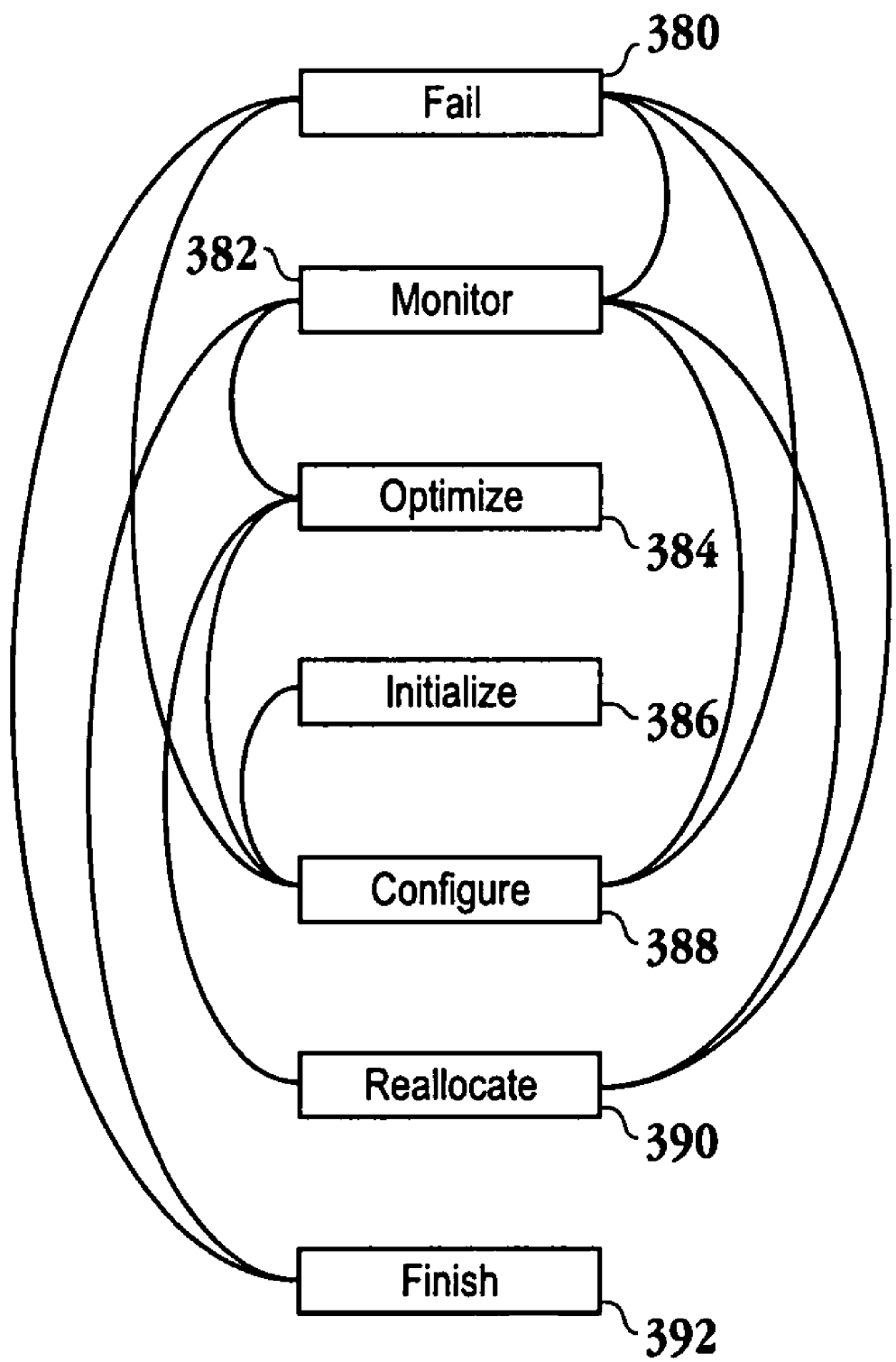
FIG. 7 is a simplified schematic diagram of a finite state machine in accordance with one embodiment of the invention.

FIG. 7 is a simplified schematic diagram of a finite state machine in accordance with one embodiment of the invention. The states include INITIALIZE 386, CONFIGURE 388, MONITOR 382, OPTIMIZE 384, REALLOCATE 390, FAIL 380, and FINISH 392. INITIALIZE 386 is entered when the daemon is started. In this state the following work is performed: a) required control structures are established; b) threads of execution are created as required by sub-components; c) decision history is loaded; and d) cleanup previous failed executions. CONFIGURE 388 is typically entered when the daemon has finished initializing. Additionally, this state may be entered from the FAIL state if the type of failure indicates that reconfigure may allow further progress to be made. In CONFIGURE 388, the configuration details are processed.

MONITOR 382 is entered when CONFIGURE 388 completes successfully, when OPTIMIZE 384 determines that no REALLOCATE 390 is required and when REALLOCATE 390 completes successfully. In this state, monitoring data is processed at intervals to determine whether or not all monitored partitions are still within their established control parameters. If the calculations indicate that a partition is about to move "out of control" then the daemon moves into OPTIMIZE 384. As described above, SPC techniques are used to determine whether a partition is still "in control." It should be appreciated that asynchronous events may also trigger a transition to the OPTIMIZE state. These asynchronous events include: dynamic reconfiguration (DR); manual resource pools reconfiguration; and component failure. In MONITOR 382 the following work is performed: a) read monitoring information from the established monitor sources; b) determine whether a re-optimization is required; and c) detect asynchronous triggers for re-optimizing.

OPTIMIZE 384 is entered when MONITOR 382 detects a requirement to re-examine the existing allocation of resources. The optimization of resource allocations is the core of the processing performed by the system daemon, poold (1M). The approach utilized is to undertake an optimized search across all possible configurations and evaluate their desirability according to user specified objectives while observing user specified constraints. It is possible that there is no more optimal configuration than that which is currently in place, in which case no reconfiguration is performed. In OPTIMIZE 384 the following work is performed: a) assess resource allocation in terms of user specified constraints/ objectives; b) create a new configuration which matches the existing workload requirements; and c) log decisions.

REALLOCATE 390 is entered when OPTIMIZE 384 determines that an alternative configuration will improve the overall performance of the system. The plan generated in OPTIMIZE 384 is used to modify the disposition of system resources. Resource partitions are created, destroyed and modified to help maintain system based goals relating to workload performance. In REALLOCATE 390 the following work is performed: a) resource configuration is modified; and b) log notifications.

FAIL 380 is entered whenever a failure condition is detected in poold(1M). Some failures may be transient and overcome following appropriate recovery procedures. Other failures are more serious and may result in termination of poold(1M). In FAIL 380 the log notifications are performed. FINISH 292 is entered when poold(1M) is terminating. Persistent data stores are updated and any required notifications are made. In FINISH 292 the persistent data is updated and log notifications are performed.

Figure 8:
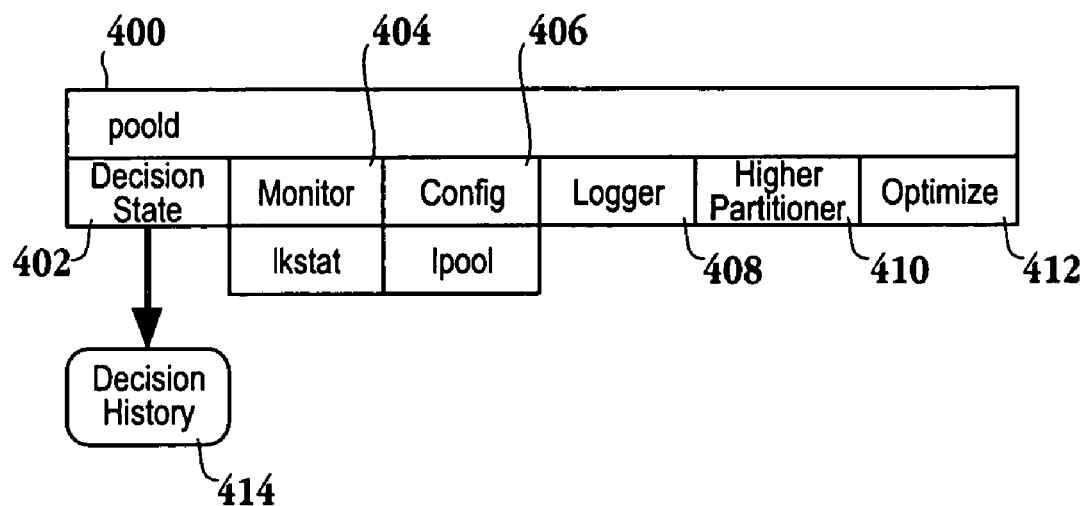
FIG. 8 is a simplified schematic diagram illustrating the structure of the system daemon in accordance with one embodiment of the invention.

FIG. 8 is a simplified schematic diagram illustrating the structure of the system daemon poold(1M) in accordance with one embodiment of the invention. It should be appreciated that poold(1M) may also be referred to as a partitioning agent. Decision state block 402 of poold(1M) 400 will maintain a history about previous actions in decision history block 414. This history will be used to help improve the quality of decision making, e.g., undesirable configurations may be retained and not used for either a certain time period or a certain number of times when the undesirable configuration is ranked highest. Thus, the information will be used to ratify that reconfigurations identified in the objective function are likely to lead to improvements in satisfying the objectives. In one embodiment, this information will be held internally while the program is executing and the monitor subsystem 404 will be responsible for maintaining this information.

Monitor subsystem 404 is responsible for updating statistics relevant to the decision making process. This information will be held within poold(1M) 400 with no state preserved in the event of a restart. It should be appreciated that internal interfaces are required to allow synchronous manipulation of the set of statistics which are to be collected. Configuration subsystem 406 stores options so that the DRP will allow the user to configure certain aspects of the behavior of poold(1M) 400. Exemplary options include, the monitoring interval, the logging level and the logging location. These options may be specified in the pools configuration. The logging level may be controlled from the command line if poold(1M) 400 is invoked manually by an administrator.

Logger block 408 includes a logging mechanism that documents information that the poold(1M) 400 generates during operation. In one embodiment, the user can control the amount of detail and the location of the logged information. Higher Partitioner block 410 is a subsystem that is responsible for maintaining communications between poold(1M) 400 and any higher level partitioners. Where there are no higher level partitioners, higher partitioner block 410 provides a logging capability. Optimize block 412 is an objective function that is implemented as a series of independent functions, each providing a contribution to the evaluation of a candidate configuration, i.e., the ranking of the configurations from a configuration examination. Each candidate configuration represents a valid method of ordering resources so that all user (and system) specified constraints are observed. Candidate configurations are generated by poold(1M) 400 which also stores the scoring information provided by the objective function.

In one embodiment, poold(1M) 400 will not necessarily generate and evaluate all possible configurations for a system, since for some combinations of available resource and constraints this figure may be very large. Therefore, a specified limit on the number of configurations to examine may be used to minimize the resources used by poold(1M) 400. All candidates are scored and ranked by poold(1M) 400 during a configuration evaluation operations. This information is stored in decision history block 414 by poold(1M) 400 and is used to improve the quality of decision making over time as described above.

Tables 3-5 provide an exemplary poolcfg script that may be used to implement the embodiments described herein for dynamically adjusting a resource pools resource allocations in response to system events and application load changes. A static configuration is first derived from the following file listed in Table 3:

TABLE 3

```
create system host
create sched TS
create sched IA
create sched FSS
create psetdev_pset(uint pset.max = 2)
create pset tp_pset (unit pset.min = 2)
create pset db_pset (uint pset.min = 4; unit pset.max = 6)
create pset app_pset (uint pset.min = 1; unit pset.max = 2)
create pool dev_pool
create pool appserver_pool
create pool db_pool
create pool tp_pool
associate pool dev_pool (sched IA; pset dev_pset)
associate pool appserver_pool (sched TS; pset app_pset)
associate pool db_pool (sched FSS; pset db_pset)
associate pool tp_pool (sched TS; pset tp_pset)
```

It should be appreciated that it is possible for an administrator to define the three types of objectives listed in Table 2. In this example, an administrator initially chooses to set a single objective, which is the "wt-load" objective with "locality" implicitly set to "tight." That is, the "locality" objective is disabled.

The following lines of Table 4 should be added to the script of Table 3 to accomplish this:

TABLE 4

```
modify system host (string system.poold.objectives='wt-load'
modify pset pset_default (string pset.poold.objectives='locality none')
modify pset dev_pset (string pset.poold.objectives='locality none')
modify pset tp_pset (string pset.poold.objectives='locality none')
modify pset db_pset (string pset.poold.objectives='locality none')
```

When the configuration script of tables 3 and 4 is applied to the system, poold(1M) will be applying the objective of trying to match resource allocation to resource utilization. This objective is a relatively simple objective, however, in tandem with the establishment of constraints (via pset.max) it can still be effective for a number of scenarios. The administrator knows which applications are executing and consuming resource (in this case processor cycles) in each resource set. Within the established constraints, it is reasonable to allow the processor resource to be transferred to the sets where it is required. Thus, a resource set that is highly utilized will be favored with resource allocations above a set that has low utilization.

However, this basic objective will not suffice to match objectives that may be set in a more tightly controlled environment. For instance, many administrators wish to ensure that utilization does not exceed a certain percentage of the available resource. This allows the administrator to be sure that applications are getting access to the resources they require. In this case, a more detailed set of objectives is required. For example, the administrator may decide not to see any of the resource sets utilized more than 80%. In addition, for the transaction processing set, tp pset, this objective is twice as important as any other objectives that are specified. At the same time, the administrator will leave the system free to keep maintaining the weighted load allocation objective.

An exemplary script used to accomplish this is listed in Table 5:

TABLE 5

```
modify pset pset_default
(string pset.poold.objectives='locality none; utilization < 80
modify pset dev_pset
(string pset.poold.objectives='locality non; utilization < 80')
modify pset tp_pset
(string pset.poold.objectives='locality non; 2: utilization < 80')
modify pset db_pset
(string pset.poold.objectives='locality none; utilization < 80')
modify pset app_pset
(string pset.poold.objectives='localit none; utilization < 80')
```

Now poold(1M) will treat the objective of maintaining utilization below 80% for the tp pset as being twice as important as for other psets in the configuration. However, since this objective will be tempered with the existing objective of maintaining "weighted load" across all the sets, this bias is somewhat offset at times when other partitions are heavily loaded. It can be seen that with combinations of the three provided objectives, varying degrees of control can be applied to the resources available in the configuration. Quite sophisticated regimes can be applied using the "utilization" objective, with more simple regimes catered to by the "locality" and "wt-load" objectives.

In summary, the present invention provides an automated resource partitioning facility through a system daemon. The system daemon periodically examines the load on the system and decides whether intervention is required to enable the system to maintain optimal performance with respect to resource consumption. If intervention is required, then the daemon will attempt to reallocate the available resources to ensure that performance objectives are satisfied. If it is not possible to meet performance objectives with available resources, then additional resources may be sought externally in one embodiment. If no external resources are available, then the daemon will allocate resources according to the objectives configured by the system administrator, where the system administrator determines which resource pools are most deserving of scarce resources.

The embodiments described herein provide a formal, automated approach to solving the problem of resource allocation based on observable behavior by introducing the notion of objectives that are directly related to workload and which can be used to detect the approaching failure of a system to meet its objectives. For those objectives that are dependent on workload behavior, Statistical Process Control may be used to identify partitions where workloads require reconfiguration to meet user configured objectives.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for dynamically allocating system resources, comprising the operations of:
    identifying an objective associated with a corresponding partition of a resource being configured according to a first configuration;
    implementing the objective as a series of independent mathematical functions, such that each mathematical function contributes to a value associated with the objective;
    detecting a violation of the objective due to a changing workload, wherein the method operation of detecting a violation of the objective due to a changing workload includes triggering a reconfiguration examination;
    generating alternative configurations base upon constraints;
    evaluating the alternative configurations to meet the objective under the changing workload;
    eliminating alternative configurations from consideration based on a decision history, the decision history tracking alternative configurations which have failed to meet the objective under the changing workload;
    ranking the alternative configurations;
    selecting a highest ranked one of the alternative configurations; and
    substituting the first configuration with the highest ranked one of the alternative configurations.

2. The method of claim 1, wherein the objective is selected from the group of objectives consisting of an objective matching resource allocation to resource utilization, an objective representing locality of allocated system resources, and an objective representing utilization of allocated system resources.

3. The method of claim 1, wherein the resource is a partitionable resource selected from the group consisting of processors, memory, swap space, and networking resources.

4. The method of claim 1, wherein the method operation of evaluating alternative configurations to meet the objective under the changing workload includes,
    tracking a workload history; and
    normalizing the workload history.

5. The method of claim 1, wherein the method operation of detecting a violation of the objective to a changing workload includes,
    tracking the workload;
    calculating a zone of control around a mean value of the objective; and
    comparing the value to a distance value representing an outer limit of the zone of control, wherein if the value is greater than the distance value for a time duration, the objective is being violated.

6. The method of claim 1, wherein the value represents a distance from the workload objective.

7. The method of claim 1, wherein the method operation of ranking the alternative configurations includes,
    comparing an amount of the resource for one of the alternative configurations with an amount of the resource for the first configuration; and
    determining an impact associated with the one of the alternative configurations based upon a difference between the amounts of the resources.

8. The method of claim 1, further comprising:
    monitoring performance of the highest ranked one of the alternative configurations;
    if the performance degrades, then the method includes,
        repeating the operations of evaluating, selecting, and substituting in order to replace the highest ranked one of the alternative configurations
        marking the highest ranked one of the alternative configurations as unacceptable to avoid use of the highest ranked one of the alternative configurations.

9. The method of claim 8, further comprising:
    setting an interval to avoid use of the highest ranked one of the alternative configurations; and
    upon expiration of the interval, reconsidering use of the highest ranked one of the alternative configurations for substitution.

10. A computer storage medium having program instructions for dynamically allocating system resources, comprising:
    program instructions for identifying an objective associated with a corresponding partition of a resource being configured according to a first configuration;
    program instructions for identifying a constraint associated with each objective;
    program instructions for detecting a violation of the objective due to a changing workload, wherein the program instructions for detecting a violation of the objective due to a changing workload includes program instructions for triggering a reconfiguration examination;

program instructions for evaluating alternative configurations to meet the objective under the changing workload;

program instructions for eliminating a number of alternative configurations from consideration based on the constraint associated with the objective and a decision history which stores alternative configurations that historically failed to meet the objective;

program instructions for ranking the alternative configurations;

program instructions for selecting a highest ranked one of the alternative configurations; and program instructions for substituting the first configuration with the highest ranked one of the alternative configurations.

11. The computer storage medium of claim 10, wherein the objective is selected from the group of objectives consisting of an objective matching resource allocation to resource utilization, an objective representing locality of allocated system resources, and an objective representing utilization of allocated system resources.

12. The computer storage medium of claim 10, wherein the resource is a partitionable resource selected from the group consisting of processors, memory, swap space, and networking resources.

13. The computer storage medium of claim 10, wherein the program instructions for evaluating alternative configurations to meet the objective under the changing workload includes,
program instructions for tracking a workload history; and
program instructions for normalizing the workload history.

14. The computer storage medium of claim 10, wherein the program instructions for detecting a violation of the objective due to a changing workload includes,
program instructions for tracking the workload;
program instructions for calculating a zone of control around a mean value of the objective; and
program instructions for comparing the value to a distance value representing an outer limit of the zone of control, wherein if the value is greater than the distance value for a time duration, the objective is being violated.

15. The computer storage medium of claim 10, further comprising:
program instructions for monitoring performance of the highest ranked one of the alternative configurations;
if the performance degrades, then triggering,
program instructions for repeating the operations of evaluating, selecting, and substituting in order to replace the highest ranked one of the alternative configurations
program instructions for marking the highest ranked one of the alternative configurations as unacceptable to avoid use of the highest ranked one of the alternative configurations.

16. The computer storage medium of claim 15, further comprising:
program instructions for setting an interval to avoid use of the highest ranked one of the alternative configurations; and
program instructions for upon expiration of the interval, reconsidering use of the highest ranked one of the alternative configurations for substitution.

17. A computing device capable of dynamically allocating resources between concurrently executing workloads, comprising:

a resource having a plurality of partitions, the resource associated with a first configuration of the plurality of partitions for executing the workloads;

a dynamic resource allocation module configured to enable selection of objectives associated with each of the plurality of partitions, the dynamic resource allocation module further including,
a configuration monitoring module for collecting and analyzing data associated with the workloads;
a statistical process control module configured to smooth the data collected by the configuration monitoring, by calculating zones of control around the selected objectives, the smoothed data being analyzed to determine if one of the objectives is unsatisfied through the configuration monitoring module, the zones of control are a multiple of a standard deviation of a mean value of the selected objectives and the zones of control setting a threshold level which trigger changing the first configuration; and;
a configuration change module for changing the first configuration to a second configuration by rearranging the plurality of partitions in response to determining that the one of the objectives is unsatisfied, such that the second configuration is selected from a number of configurations not eliminated by a decision history which stores alternative configurations that historically failed to meet the objective;
wherein the dynamic resource allocation module is configured to store previously non-effective configurations for a time interval and is further configured to verify that the second configuration is different than any previously non-effective configurations prior to changing the first configuration.

18. The computing device of claim 17, wherein the resource is selected from the group consisting of, a processor set, a memory, a swap space, and a network resource.

19. The computing device of claim 17, wherein the statistical process control module considers both a magnitude and a duration of the data collected to smooth the collected data.

20. The computing device of claim 17, wherein the computing device is a server.

21. The computing device of claim 17, wherein the computing device is in communication with a plurality of clients over a distributed network, the plurality of clients generating the workloads.

22. A distributed computing resource system capable of dynamically allocating resources, comprising:
a server in communication with at least one consumer over a distributed network, the server including,
a resource having a plurality of partitions, the resource associated with a first configuration of the plurality of partitions for executing a workload associated with the at least one consumer;
a dynamic resource allocation module configured to enable selection of objectives associated with each of the plurality of partitions, the dynamic resource allocation module further including,
logic for tracking data associated with the workload;
logic for filtering the tracked data, the filtered data being analyzed to determine if one of the objectives is unsatisfied; and
logic for changing the first configuration to a second configuration by rearranging the plurality of partitions in response to determining that the one of the objectives is unsatisfied, wherein the second configuration is based on a decision history, the decision history eliminating alternative configurations which have historically failed to meet the objective under the changing workload, wherein the dynamic resource allocation module is configured to store previously non-effective configurations for a time interval, and is further configured to verify that the second configuration is different than any previously non-effective configurations prior to changing the first configuration.

23. The system of claim 22, wherein the logic for filtering the tracked data is further configured to define a zone of control around a mean value of each of the objectives, the zone of control defining a range outside of which the objective is considered unsatisfied, and the zones of control are a multiple of a standard deviation of a mean value of the selected objectives.

24. The system of claim 22, wherein the resource is selected from the group consisting of, a processor set, a memory, a swap space, and a network resource.

25. The system of claim 22, wherein the logic for filtering the tracked data considers both a magnitude and a duration of the tracked data to filter the tracked data.

* * * * *